(12) United States Patent
Ando et al.

(10) Patent No.: US 6,895,750 B2
(45) Date of Patent: May 24, 2005

(54) NOZZLE VANE DRIVING CONTROL APPARATUS OF VARIABLE NOZZLE TURBOCHARGER

(75) Inventors: Yoshiyuki Ando, Yokohama (JP); Takumi Arao, Yokohama (JP); Takaaki Sekine, Yokohama (JP); Haruo Saito, Yokohama (JP)

(73) Assignee: Jidosha Denki Kogyo Co., Ltd., Yokohama (JP)

( * ) Notice: Subject to any disclaimer, the term of this patent is extended or adjusted under 35 U.S.C. 154(b) by 0 days.

(21) Appl. No.: 10/780,910

(22) Filed: Feb. 19, 2004

(65) Prior Publication Data

US 2004/0187495 A1 Sep. 30, 2004

(30) Foreign Application Priority Data

Feb. 20, 2003 (JP) ..................................... P2003-042583

(51) Int. Cl.[7] ............................................. F02D 23/00
(52) U.S. Cl. .......................... 60/602; 415/150; 415/160
(58) Field of Search ........................... 60/602; 415/150, 415/160

(56) References Cited

U.S. PATENT DOCUMENTS

| | | | | |
|---|---|---|---|---|
| 5,701,741 A | * | 12/1997 | Halsall | ........................ 60/602 |
| 6,155,126 A | | 12/2000 | Vogt et al. | |
| 2003/0007865 A1 | * | 1/2003 | Chard et al. | ................ 415/150 |
| 2003/0089109 A1 | * | 5/2003 | Park | ............................ 60/602 |
| 2003/0185672 A1 | * | 10/2003 | Suganami et al. | .......... 415/150 |

FOREIGN PATENT DOCUMENTS

| | | |
|---|---|---|
| EP | 1 009 088 A2 | 6/2000 |
| EP | 1 349 259 A2 | 10/2003 |
| JP | 11-334379 | 12/1999 |
| JP | 2001-107738 | 4/2001 |
| JP | 2001-219742 | 8/2001 |
| JP | 2002-349641 | 12/2002 |

OTHER PUBLICATIONS

European Search Report dated Oct. 5, 2004.

* cited by examiner

Primary Examiner—Thai-Ba Trieu
(74) Attorney, Agent, or Firm—McGinn & Gibb, PLLC (57) ABSTRACT

In a nozzle vane driving control apparatus of a variable nozzle turbocharger including an actuator for carrying out a driving operation for opening and closing a nozzle vane of a variable nozzle and an ECU for controlling the opening degree of the nozzle vane which is obtained by the actuator, an actuator cover for covering a pinion and reduction gears by interposing a base provided integrally with a motor case portion therebetween, a unit body accommodating each of control boards, a position sensor for detecting the rotating position of an output shaft and a connector having a terminal connecting a motor and each of the control boards, and a unit cover for covering the unit body are removably fastened and fixed with a bolt and are thus integrated with each other.

5 Claims, 7 Drawing Sheets

NOZZLE VANE DRIVING CONTROL APPARATUS OF VARIABLE NOZZLE TURBOCHARGER

The present application is based on Japanese Patent Application No. 2003-42583, the entire contents of which are incorporated herein by reference.

BACKGROUND OF THE INVENTION

1. Field of the Invention

The present invention relates to a nozzle vane driving control apparatus of a variable nozzle turbocharger which is to be used in a diesel engine for a car, for example.

2. Related Art

For example, a stepping motor has been used as an actuator for carrying out a driving operation for opening and closing the nozzle vane of the variable nozzle turbocharger (for example, see JP-A-2001-107738, Pages 4 and 5, FIG. 1). An operating piece coupled to the stepping motor is operated so that a spindle is rotated to open or close each of the nozzle vanes of a variable nozzle through a link mechanism. Moreover, the driving operation of the stepping motor is controlled corresponding to the operating situation of an engine by an electronic control unit (ECU) and the flow velocity of an exhaust gas to be sprayed onto a turbine wheel is regulated.

In the conventional variable nozzle turbocharger, however, an actuator for opening and closing each of the nozzle vanes of the variable nozzle and an electronic control unit for controlling the driving operation of the actuator depending on the operating situation of the engine are separately attached to the turbocharger. Therefore, a large attachment space is indispensable. Correspondingly, the size of the whole turbocharger is increased and a weight is increased. Moreover, a cable for electrically connecting the actuator and the electronic control unit is to be provided under bad conditions of a high thermal environment. For this reason, it is hard to always maintain a durability and a responsiveness.

SUMMARY OF THE INVENTION

The invention has been made in order to solve the problems and has an object to provide a nozzle vane driving control apparatus of a variable nozzle turbocharger which can integrate an actuator and an electronic control unit with each other to save an attachment space and to reduce a size and a weight, and furthermore, can enhance a durability and a responsiveness.

A first aspect of the invention is directed to a nozzle vane driving control apparatus of a variable nozzle turbocharger comprising an actuator for carrying out a driving operation for opening and closing a nozzle vane of a variable nozzle and an electronic control unit for controlling an opening degree of the nozzle vane which is obtained by the actuator, wherein the actuator is constituted by a base having a motor case portion, a motor to be accommodated in the motor case portion, a pinion provided on the base and coupled to a motor shaft of the motor, an output shaft having a sector gear supported rotatably on the base and mated with the pinion through a plurality of reduction gears, an output arm fixed to an upper portion of the output shaft and connected to the nozzle vane, and an actuator cover for covering the pinion and the reduction gears, and the electronic control unit is constituted by a unit body attached removably to a lower end of the base, at least a pair of control boards accommodated in the unit body, a position sensor attached to a lower portion of the output shaft so as to oppose the upper control board and serving to detect a rotating position of the output shaft, a connector having a terminal accommodated in the unit body and connecting the motor and each of the control boards, and a unit cover for covering the unit body, and the actuator cover, the base, the unit body and the unit cover are removably attached by fastening members and are thus integrated with each other.

In the nozzle vane driving control apparatus of the variable nozzle turbocharger, the actuator and the electronic control unit are integrated with each other. Consequently, an attachment space can be saved and a size and a weight can be reduced, and furthermore, a durability and a responsiveness can be enhanced.

A second aspect of the invention is directed to the nozzle vane driving control apparatus of the variable nozzle turbocharger according to the first aspect of the invention, wherein a brushless motor is used as the motor.

In the nozzle vane driving control apparatus of the variable nozzle turbocharger, the brushless motor is used as a motor. Consequently, the lifetime, of the actuator can be prolonged, and furthermore, the durability can be enhanced still more.

A third aspect of the invention is directed to the nozzle vane driving control apparatus of the variable nozzle turbocharger according to the first or second aspect of the invention, wherein a pair of the control boards are provided opposite to each other in two stages interposing a partition wall in the unit body therebetween in a vertical direction, a plurality of chip components is mounted on the upper control board, and a plurality of electronic chip components to be heat generating components is mounted on the lower control board.

In the nozzle vane driving control apparatus of the variable nozzle turbocharger, a pair of control boards are provided opposite to each other in the two stages in the vertical direction, interposing therebetween the partition wall in the unit body. Consequently, the heat generating component mounted on the lower control board can effectively generate heat by the partition wall, and furthermore, the heat can be prevented from being transmitted from the heat generating component to the electronic chip component mounted on the upper control board.

A fourth aspect of the invention is directed to the nozzle vane driving control apparatus of the variable nozzle turbocharger according to any of the first to third aspects of the invention, wherein the position sensor for detecting a position of the output shaft is a non-contact type sensor.

A fifth aspect of the invention is directed to the nozzle vane driving control apparatus of the variable nozzle turbocharger according to the fourth aspect of the invention, wherein the position sensor is constituted by a magnet attached to the lower portion of the output shaft through a holder, and a magneto-resistive element mounted on a surface of the upper control board which is opposed to the magnet and serving to detect a direction of a magnetic field of the magnet.

In the nozzle vane driving control apparatus of the variable nozzle turbocharger according to the fourth or fifth aspect of the invention, in addition to the functions and advantages according to any of the first to third aspects of the invention, the position sensor for detecting the position of the output shaft is of a non-contact type. Consequently, it is possible to enhance the abrasion resistance of a component constituting the position sensor.

DETAILED DESCRIPTION OF THE PREFERRED EMBODIMENTS

An embodiment of the invention will be described below with reference to the drawings.

Figure 1:
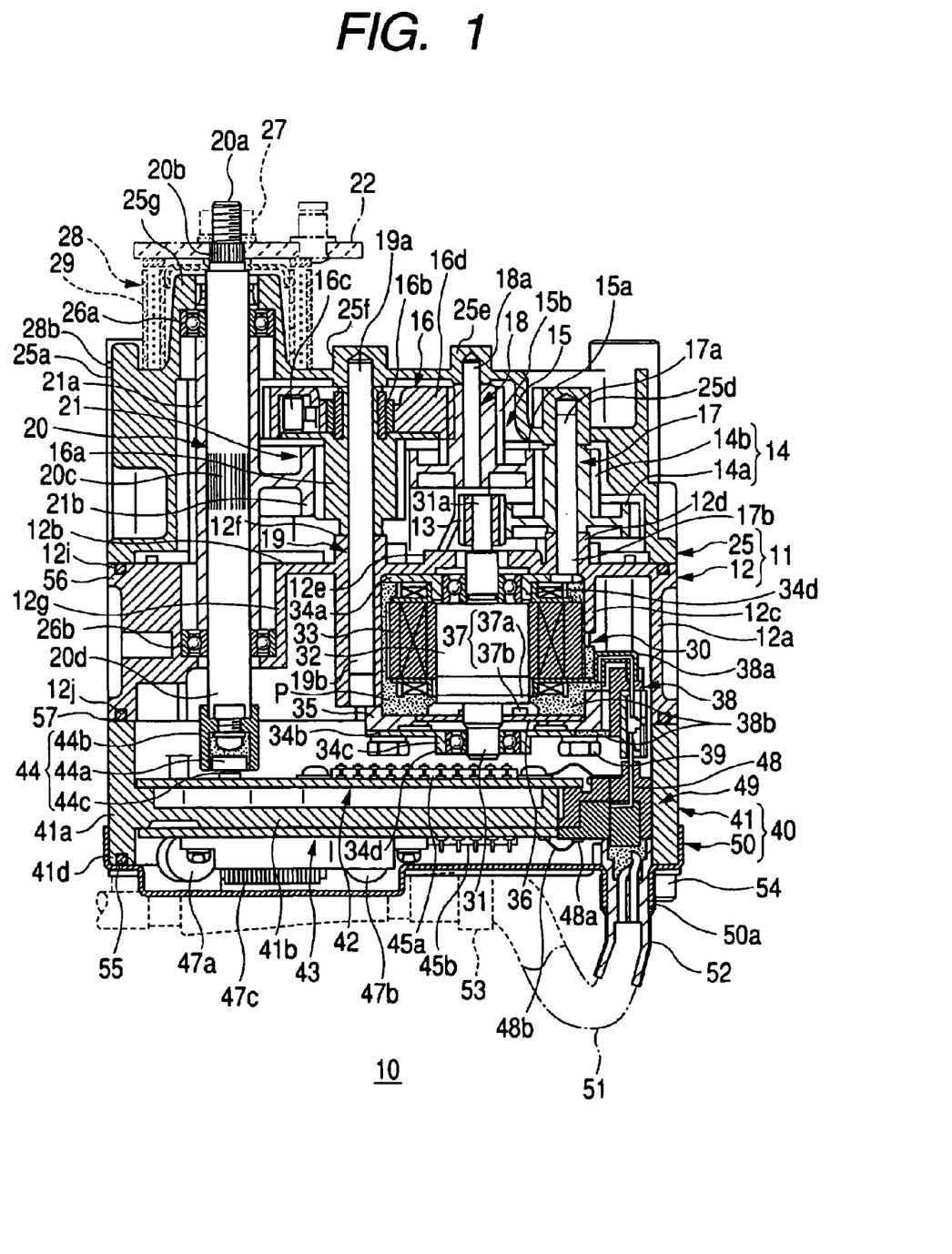
FIG. 1 is a sectional view showing a nozzle vane driving control apparatus of a variable nozzle turbocharger according to an embodiment of the invention.
Figure 2:
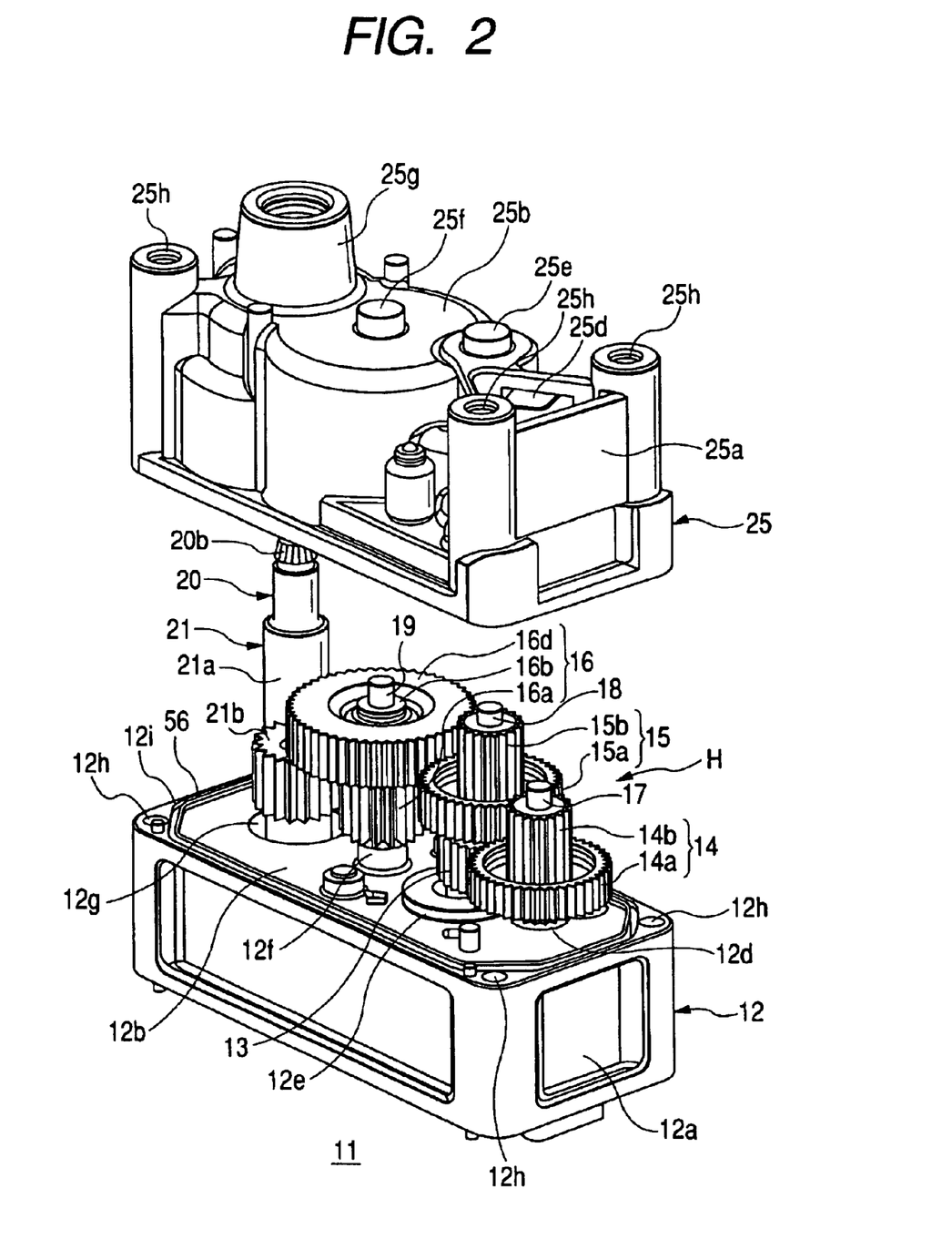
FIG. 2 is a perspective view showing a state in which an actuator cover of an actuator constituting a part of the nozzle vane driving control apparatus is removed.
Figure 3:
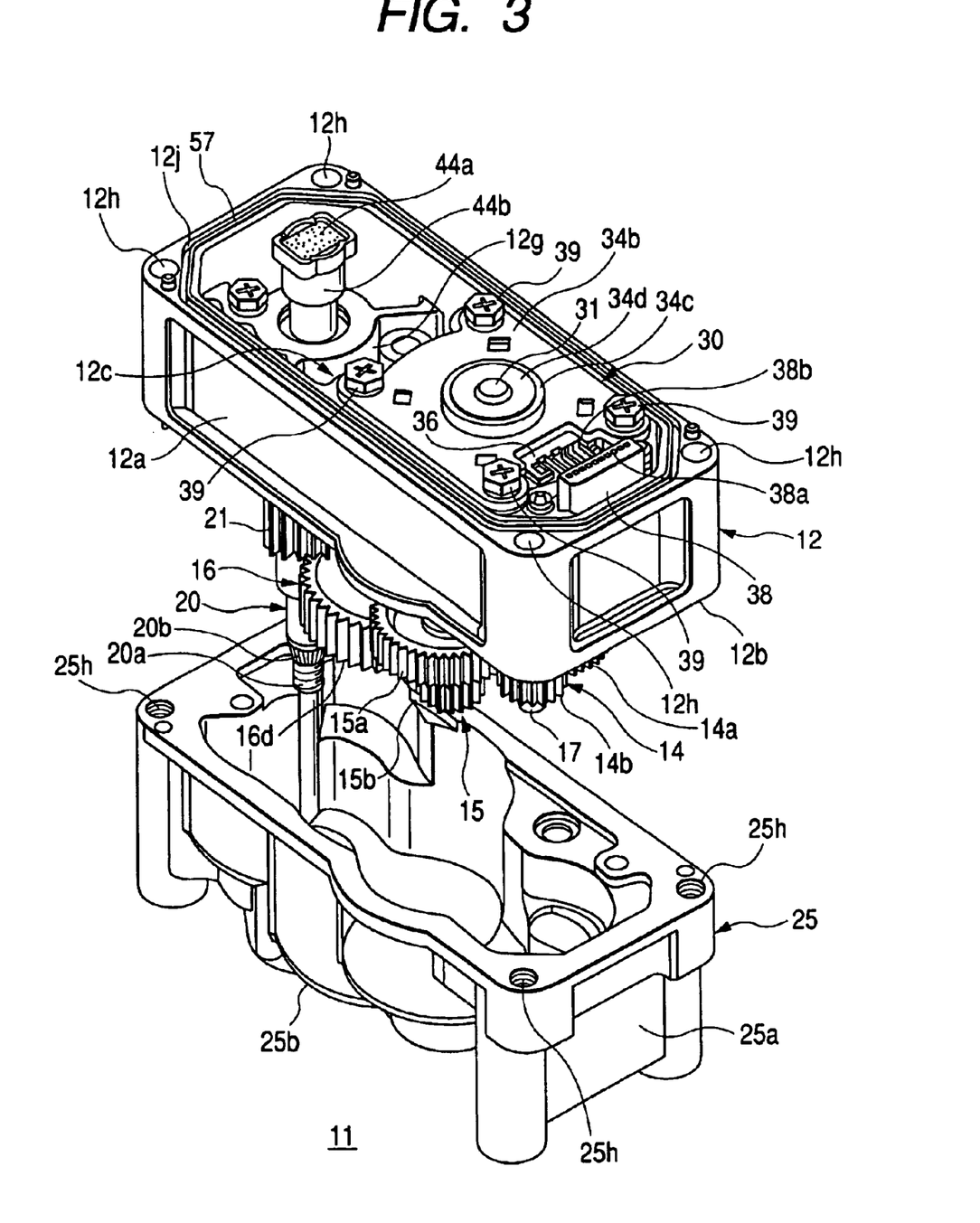
FIG. 3 is a perspective view showing the actuator from which the actuator cover is removed as seen from a back side.
Figure 4:
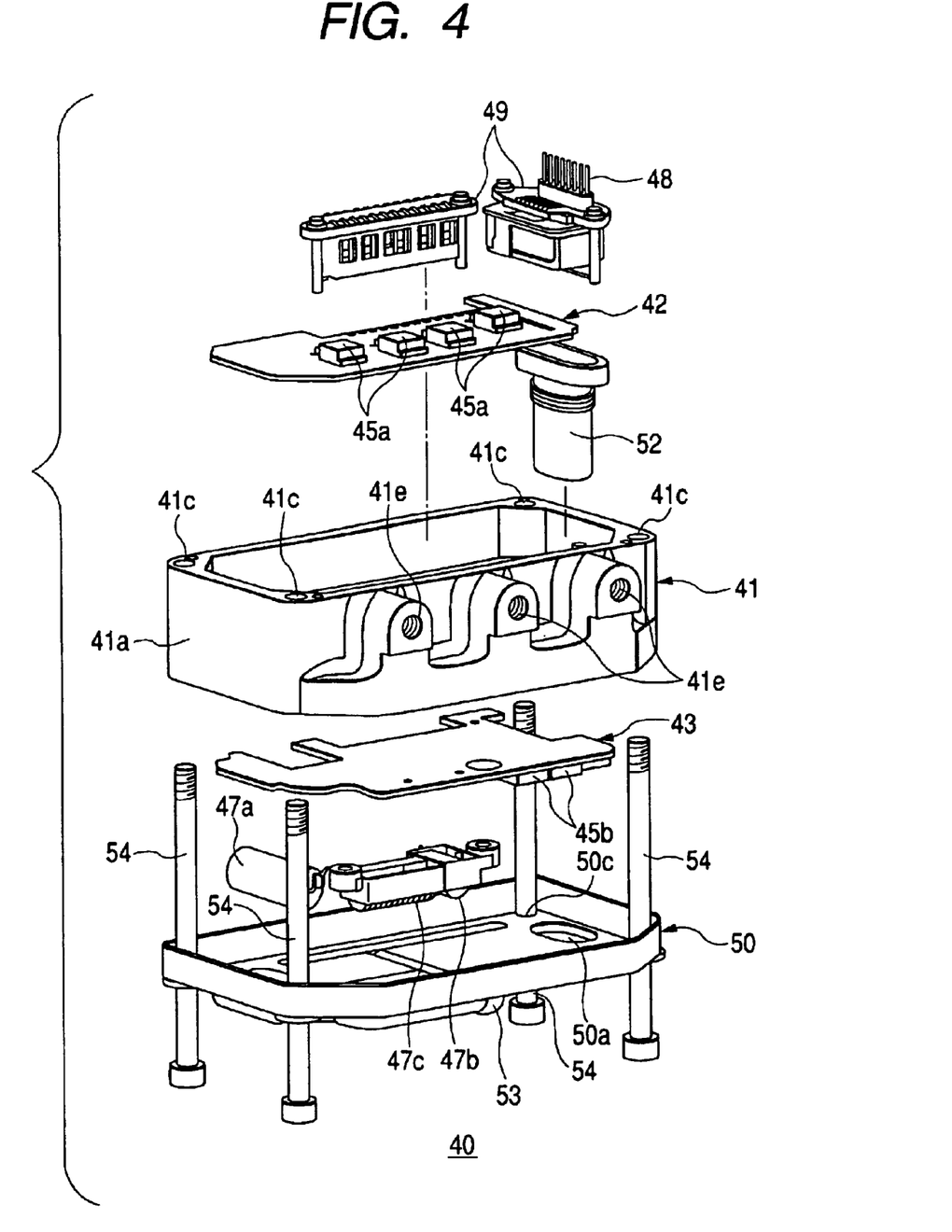
FIG. 4 is an exploded perspective view showing an electronic control unit constituting a part of the nozzle vane driving control apparatus.
Figure 5:
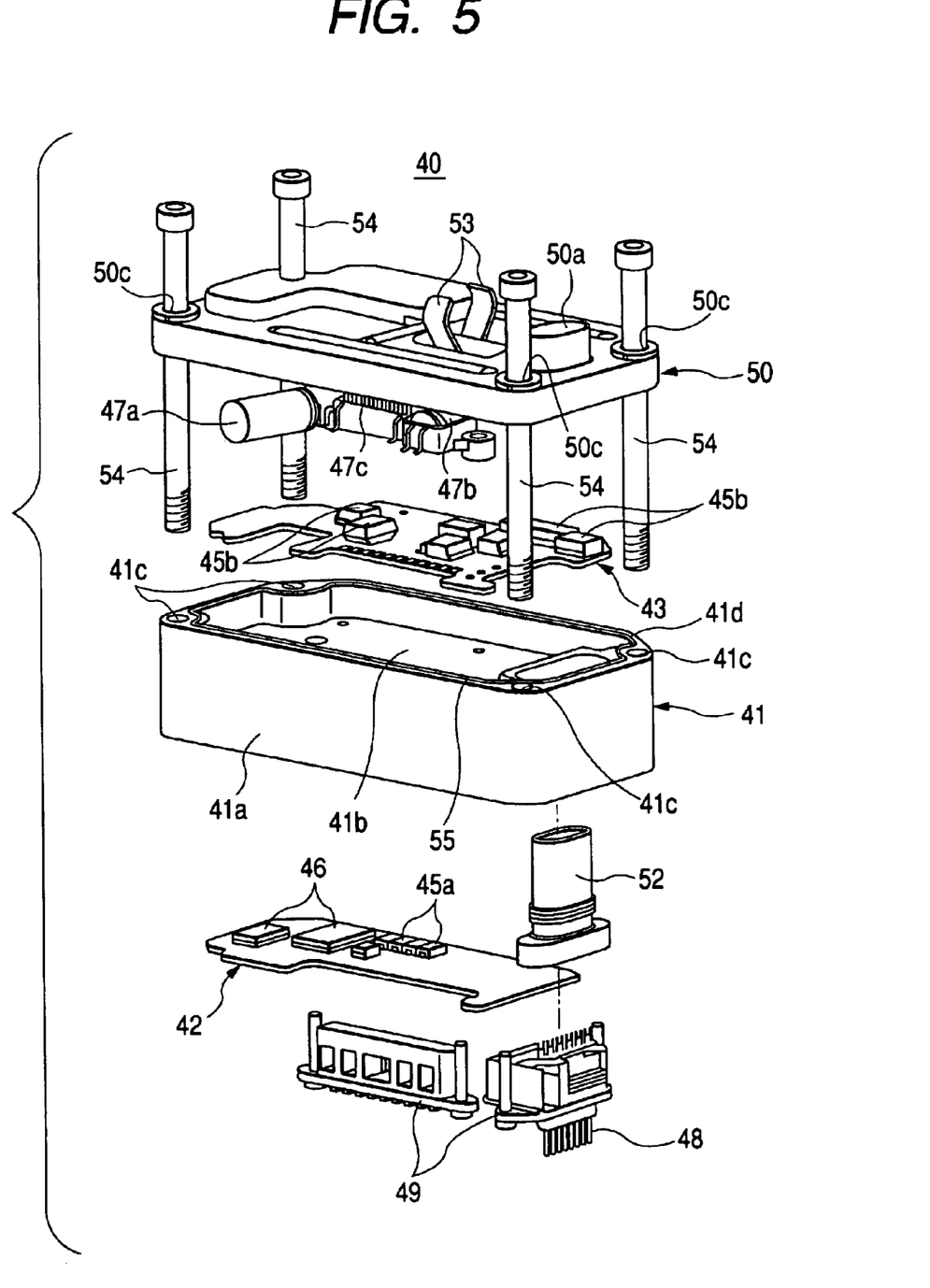
FIG. 5 is an exploded perspective view showing the electronic control unit seen from the back side.
Figure 6:
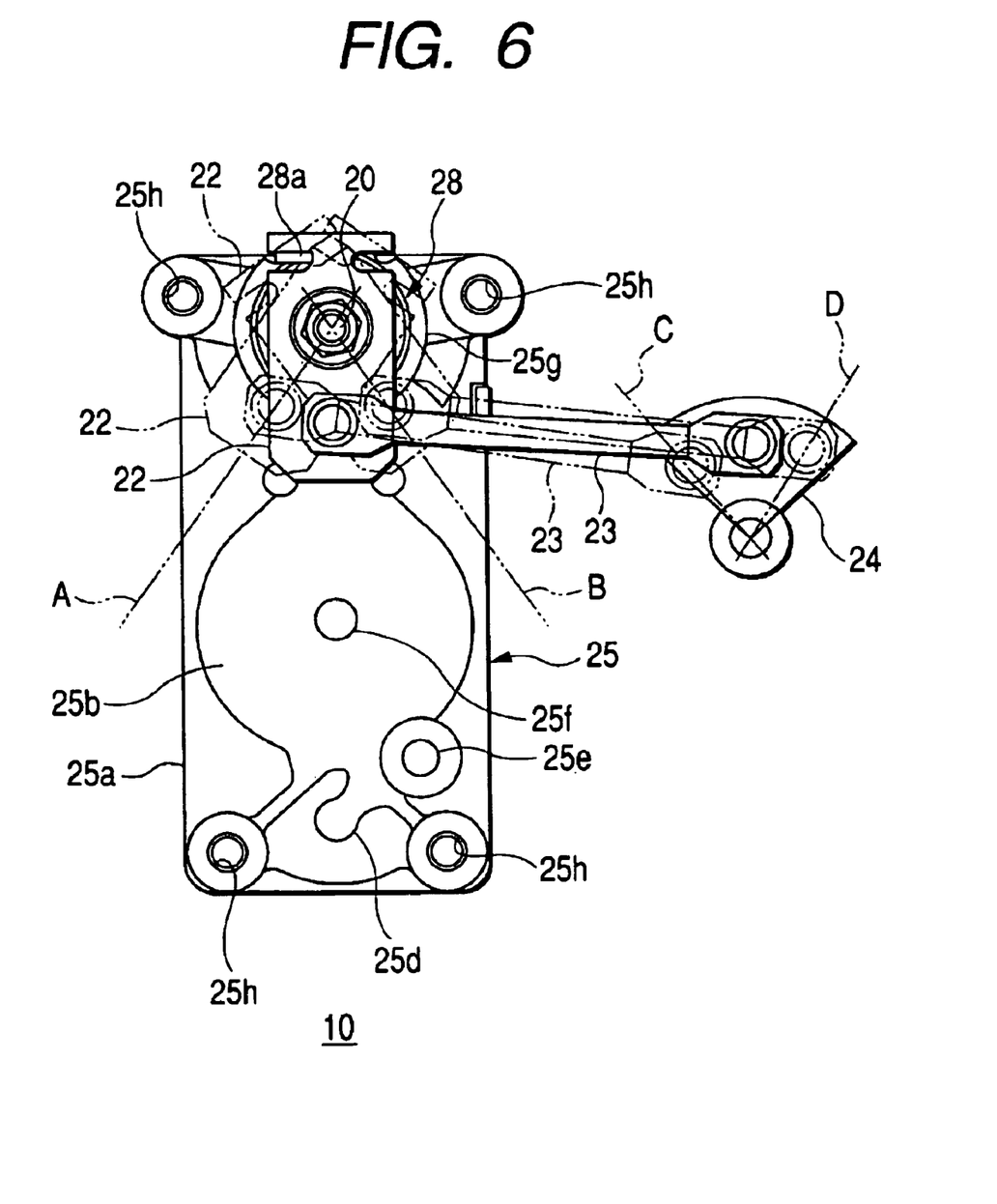
FIG. 6 is a plan view for explaining the movement of an output arm of the actuator.
Figure 7:
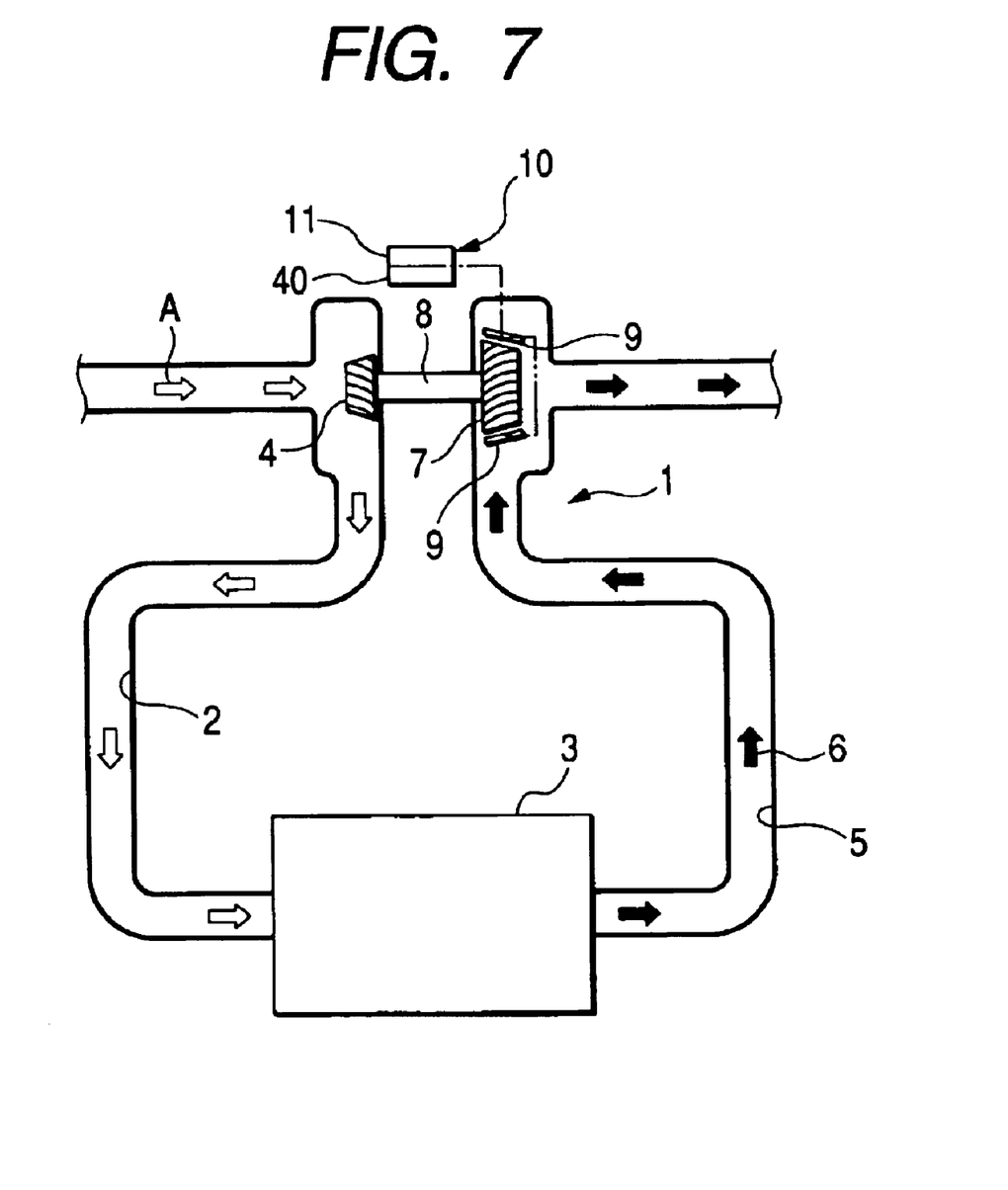
FIG. 7 is a typical view showing the variable nozzle turbocharger.

FIG. 1 is a sectional view showing a nozzle vane driving control apparatus of a variable nozzle turbocharger according to an embodiment of the invention, FIG. 2 is a perspective view showing a state in which an actuator cover of an actuator constituting a part of the nozzle vane driving control apparatus is removed, FIG. 3 is a perspective view showing the actuator seen from a back side, FIG. 4 is an exploded perspective view showing an electronic control unit constituting a part of the nozzle vane driving control apparatus, FIG. 5 is an exploded perspective view showing the electronic control unit seen from the back side, FIG. 6 is a plan view for explaining the movement of a swing arm of the actuator, and FIG. 7 is a typical view showing the variable nozzle turbocharger.

As shown in FIG. 7, a turbocharger 1 of a variable nozzle type comprises a compressor wheel 4 for feeding air A to a diesel engine 3 provided on the downstream of an air intake path 2, a turbine wheel 7 to be rotated by spraying an exhaust gas 6 passing through an exhaust gas path 5, and a rotor shaft 8 for rotatably coupling the wheels 4 and 7 integrally. The flow velocity of the exhaust gas 6 sprayed onto the turbine wheel 7 is regulated by controlling the opening and closing operations of each of nozzle vanes 9 of a variable nozzle by a nozzle vane driving control apparatus 10.

As shown in FIG. 1, the nozzle vane driving control apparatus 10 is constituted by integrating an actuator 11 for carrying out a driving operation for opening and closing each of the nozzle vanes 9, and an electronic control unit (ECU) 40 for controlling the opening degree of the nozzle vane 9 which is obtained by the actuator 11 and regulating the flow velocity of the exhaust gas 6 to be sprayed onto the turbine wheel 7.

As shown in FIGS. 1 to 3 and 6, the actuator 11 is generally constituted by a base 12 having a motor case portion 12c integrally, a brushless motor (motor) 30 to be accommodated in the motor case portion 12c, a pinion 13 provided on the base 12 and coupled to a motor shaft 31 of the brushless motor 30, an output shaft 20 having a sector gear 21 supported rotatably on the base 12 and mated with the pinion 13 through first, second and third reduction gears 14, 15 and 16, an output arm 22 fixed to an upper portion 20b of the output shaft 20 and connected to the nozzle vane 9 through a rod 23 and a linkage arm 24, and an actuator cover 25 formed by aluminum alloy die casting which covers the pinion 13 and the first, second and third reduction gears 14, 15 and 16.

As shown in FIGS. 1 to 3, the base 12 is box-shaped to have a lower surface opened by a peripheral wall 12a and a top wall 12b, and the cylindrical motor case portion 12c is integrally protruded at one end side from a center on the lower surface of the top wall 12b. Moreover, first, second and third cylindrical portions 12d, 12e and 12f are integrally protruded from the upper surface of the top wall 12b of the base 12, and furthermore, a fourth cylindrical portion 12g is integrally protruded at the other end side from the center on the lower surface of the top wall 12b. Furthermore, the actuator cover 25 is box-shaped with a lower surface opened by a peripheral wall 25a and a top wall 25b, and first, second, third and fourth cylindrical portions 25d, 25e, 25f and 25g are integrally protruded in the positions of the top wall 25b which are opposed to the first, second, third and fourth cylindrical portions 12d, 12e, 12f and 12g of the base 12.

As shown in FIG. 1, upper and lower portions 17a and 17b of a first spindle 17 are fitted and fixed into the first cylindrical portion 12d of the base 12 and the first cylindrical portion 25d of the actuator cover 25. The first reduction gear 14 is caused to penetrate through the first spindle 17 and is rotatably supported. The first reduction gear 14 has a large diameter tooth portion 14a and a small diameter tooth portion 14b formed integrally, and the large diameter tooth portion 14a is mated with the metallic pinion 13 fixed to the motor shaft 31.

Moreover, an upper portion 18a of a second spindle 18 is fitted and fixed into the second cylindrical portion 25e of the actuator cover 25. The second reduction gear 15 is caused to penetrate through the second spindle 18 and is prevented from slipping off, and is rotatably supported thereon. The second reduction gear 15 has a large diameter tooth portion 15a and a small diameter tooth portion 15b formed integrally, and the large diameter tooth portion 15a is mated with the small diameter tooth portion 14b of the first reduction gear 14.

Furthermore, upper and lower portions 19a and 19b of a third spindle 19 are fitted and fixed into the third cylindrical portion 12f of the base 12 and the third cylindrical portion 25f of the actuator cover 25. The third reduction gear 16 is caused to penetrate through the third spindle 19 and is rotatably supported thereon. The third reduction gear 16 is constituted by a small diameter gear 16a and a large diameter gear 16d which is supported rotatably on the outer periphery of a cylindrical portion 16b of the small diameter gear 16a through a plurality of damper members 16c and is prevented from slipping from the cylindrical portion 16b.

The small diameter gear 16a of the third reduction gear 16 is mated with the sector gear 21 fixed to the output shaft 20, and furthermore, the large diameter gear 16d is mated with the small diameter tooth portion 15b. of the second reduction gear 15. Moreover, the damper members 16c provided between the small diameter gear 16a and the large diameter gear 16d have the function of being elastically deformed to absorb a large shock applied from the sector gear 21 to the third reduction gear 16 through the small diameter gear 16a and to prevent a large impulsive force from being transmitted to the second reduction gear 15. A reduction gear mechanism H for decreasing the rotation of the pinion 13 of the motor shaft 31 and transmitting the same rotation to the sector gear 21 is constituted by the first, second and third reduction gears 14, 15 and 16.

In addition, the upper and lower portions of the output shaft 20 are rotatably supported through a pair of bearings 26a and 26b in the fourth cylindrical portion 12g of the base 12 and the fourth cylindrical portion 25g of the actuator cover 25. A cylindrical portion 21a of the sector gear 21 is fitted and fixed into a serration portion 20c formed on the center of the output shaft 20. A sector teeth portion 21b protruded integrally from the center of the cylindrical portion 21a of the sector gear 21 is mated with the small diameter gear 16a of the third reduction gear 16. Furthermore, the serration portion 20b provided in the upper portion of the output shaft 20 is exposed outward from the fourth cylindrical portion 25g of the actuator cover 25 and the output arm 22 is fitted in the serration portion 20b. The output arm 22 is fastened and fixed to the serration portion 20b with a nut 27 screwed into a screw portion formed on an upper end 20a of the output shaft 20.

Moreover, a return spring 28 for always energizing the output arm 22 in a predetermined direction is attached to the outer periphery of the fourth cylindrical portion 25g of the actuator cover 25 through an insulator 29. An end 28a of the return spring 28 is engaged with the output arm 22, and the other end 28b is engaged with the actuator cover 25.

As shown in FIGS. 1 and 3, the brushless motor 30 is a DC motor and includes the motor shaft 31, a rotor 32 formed by a magnet fixed to the motor shaft 31, and a stator 33 formed by winding a coil thereupon and serving to rotate the rotor 32. The coil portion of the stator 33 is sealed with a resin P. The sealing portion of the resin P is interposed between an upper. cover 34a and a lower cover 34b as well as between the upper cover 34a and a board holder 35 so as to be integrated. Thus, the sealing portion of the resin P is fastened and fixed to the motor case portion 12c of the base 12 through a bolt (fastening member) 39.

As shown in FIG. 1, the motor shaft 31 is rotatably supported on a bearing 34d fitted in each cylindrical portion 34c on the centers of a pair of upper and lower covers 34a and 34b, and a tip portion 31a is exposed outward from the second cylindrical portion 12e of the base 12. The pinion 13 is fitted and fixed into the tip portion 31a of the motor shaft 31. Moreover, a circuit board 36 is held in a board holder 35. The circuit board 36 penetrates through the lower portion of the motor shaft 31 and is opposed to a magnet 37a for a sensor provided below the rotor 32 at a predetermined distance. Three Hall elements 37b are attached to the circuit board 36 opposed to the magnet 37a for a sensor. A position sensor 37 for detecting the rotating position of the motor shaft 31 is constituted by the magnet 37a and the Hall element 37b. More specifically, the Hall element 37b detects the direction of the magnetic field of the magnet 37a to transmit information about the rotating angle of the motor shaft 31 to a CPU 46 of a control board 42 which will be described below. Furthermore, the stator 33 and the circuit board 36 are connected to a plurality of female terminals 38a of a connector 38 through soldering 38b.

As shown in FIGS. 1, 4 and 5, an electronic control unit 40 is generally constituted by a unit body 41 having an H-shaped section which is removably attached to the lower end of the base 12 and is formed by aluminum alloy die casting, a pair of control boards 42 and 43 provided opposite to each other in two stages in a vertical direction with a partition wall 41b on a center in the axial direction of the unit body 41 interposed therebetween, a position sensor 44 attached to the upper control board 42 and a lower portion 20d of the output shaft 20 and serving to detect the rotating position of the output shaft 20, a connector 49 having a plurality of terminals 48 for connecting the brushless motor 30 and each of the control boards 42 and 43, and a unit cover 50 formed by an iron plate which serves to cover the lower control board 43 and the connector 49.

A plurality of electronic chip components 45a forming a control circuit and a magneto-resistive element (MR element) 44c of the position sensor 44 are mounted on the surface of the upper control board 42. The position sensor 44 is constituted by a magnet 44a taking the shape of a rectangular plate which is attached to the lower portion 20d of the output shaft 20 through a holder 44b formed of a resin, and the magneto-resistive element 44c mounted on the surface of the upper control board 42 which is opposed to the magnet 44a. More specifically, the magneto-resistive element 44c detects the direction of the magnetic field of the magnet 44a to transmit information about the rotating angle of the output shaft 20 to the CPU (central processing unit) 46 mounted on the back side of the upper control board 42.

Moreover, a plurality of electronic chip components 45b, and a pair of capacitors 47a and 47b and an inductor 47c which form a control circuit are mounted on the back face of the lower control board 43. Each electronic chip component 45a of the upper control board 42 and each electronic chip component 45b of the lower control board 43 are connected to the terminals 48 of the connector 49 through wire bondings 48a and 48b.

The unit cover 50 is box-shaped with the upper face side of the iron plate opened in order to cover the electronic chip components 45b to be heat generating components mounted on the lower control board 43, and the capacitors 47a and 47b and the inductor 47c and has waterproofing and dust-proofing functions against an outside. Moreover, a cylindrical portion 50a for inserting a holder 52 to hold a harness 51 of the connector 49 is integrally protruded in a position of the unit cover 50 which is opposed to the connector 49, and furthermore, a pair of holding pieces 53 for holding the harness 51 are attached to almost the center of the back face of the unit cover 50.

Furthermore, a round bolt insertion hole 50c for inserting a lung bolt (fastening member) 54 therethrough is formed in the four corner portions of the unit cover 50. A round bolt insertion hole 41c is also formed on a peripheral wall 41a of the unit body 41 opposed to the bolt insertion hole 50c, and furthermore, a round bolt insertion hole 12h is formed on the peripheral wall 12a of the base 12 opposed to the bolt insertion hole 41c. Moreover, a round screw hole 25h is formed on the peripheral wall 25a of the actuator cover 25 which is opposed to the bolt insertion hole 12h. The unit cover 50, the unit body 41, the base 12 and the actuator cover 25 are inserted through the bolt insertion holes 41c and 12h from the bolt insertion hole 50c of the unit cover 50 respectively, and are removably attached with the bolt 54 fastened and fixed to the screw hole 25h of the actuator cover 25 and are thus integrated with each other, A ring groove-shaped concave portion 41d is formed on the center of the lower surface of the peripheral wall 41a of the unit body 41 and a ring-shaped rubber packing 55 for sealing is fitted in the concave portion 41d. Moreover, ring groove-shaped concave portions 12i and 12j are formed on the centers of the upper and lower surfaces of the peripheral wall 12a of the base 12 respectively, and ring-shaped rubber packings 56 and 57 for sealing are fitted in the concave portions 12i and 12j respectively. Furthermore, a plurality of screw holes 41e for removably attaching the nozzle vane driving control apparatus 10 to the turbocharger 1 of the variable nozzle type is formed on the peripheral wall 41a of the unit body 41 through a bracket and a bolt which are not shown.

According to the nozzle vane driving control apparatus 10 of the turbocharger 1 of the variable nozzle type in accordance with the embodiment, the actuator 11 for carrying out a driving operation for opening and closing the nozzle vane 9 of the variable nozzle and the electronic control unit 40 for controlling the opening degree of the nozzle vane 9 which is obtained by the actuator 11 and regulating the flow velocity of the exhaust gas 5 to be sprayed onto the turbine wheel 7 are removably attached and integrated with the bolt 54. Such a nozzle vane driving control apparatus 10 is screwed and attached to the turbocharger 1 of the variable nozzle type of the commercial diesel engine 3 and the harness 51 of the electronic control unit 40 is connected to an engine control unit which is not shown.

The tip portion of the output arm 22 of the actuator 11 is coupled to the linkage arm 24 of the nozzle vane 9 through the rod 23 and is mounted on the diesel engine 3 of a vehicle. When the exhaust gas 6 of the diesel engine 3 is to be sprayed onto the turbine wheel 7 of the turbocharger 1 of the variable nozzle type in an optimum direction at an optimum speed depending on a running situation during the running operation of the vehicle, consequently, the position signal of the nozzle vane 9 to be a target is given to the electronic control unit 40 of the nozzle vane driving control apparatus 10 by the engine control unit and an exciting current is supplied to the stator 33 of the DC brushless motor 30 so that the rotor 32 is rotated and the output shaft 20 is rotated by the rotation of the pinion 13 through the reduction gear mechanism H Consequently, the output arm 22 is rotated from a position A to a position B shown in FIG. 6 and the linkage arm 24 is rotated from a position C to a position D so that the angle of the nozzle vane 9 is changed. In this case, the rotating positions of the motor shaft 31 and the output shaft 20 are detected by the position sensors 37 and 44 respectively, and detection information thereof is transmitted to the CPU 46 of the electronic control unit 40 and the engine control unit respectively and a control is carried out to bring a proper state depending on the running situation of the vehicle.

Thus, the actuator 11 for carrying out a driving operation for opening and closing the nozzle vane 9 of the variable nozzle and the electronic control unit 40 for controlling the opening degree of the nozzle vane 9 which is obtained by the actuator 11 and regulating the flow velocity of the exhaust gas 5 sprayed onto the turbine wheel 7 are removably attached with the bolt 54 and are thus integrated with each other. Consequently, it is possible to save the attachment space of the nozzle vane driving control apparatus 10 to the turbocharger 1 of the variable nozzle type and to reduce a size and a weight, and furthermore, to enhance a durability and a responsiveness.

Since the DC brushless motor 30 is used as a motor, moreover, it is not subjected to the abrasion of the brush as in a commutator motor, can be used for a long period of time and is easy to use. Consequently, it is possible to prolong the lifetime of the actuator 11 and to enhance the durability still more.

Moreover, a pair of control boards 42 and 43 are provided opposite to each other in the two stages in the vertical direction with the partition wall 41b on the center in the axial direction of the unit body 41 interposed therebetween. Consequently, the heat generating component 45b mounted on the lower control board 43 can effectively generate heat by the partition wall 41b, and furthermore, the transfer of the heat from the heat generating component 45b to the electronic chip component 45a mounted on the upper control board 42 can be hindered.

Furthermore, the position sensor 44 for detecting the position of the output shaft 20 is a non-contact type sensor including the magnet 44a taking the shape of a rectangular plate which is attached to the lower portion 20d of the output shaft 20 through the holder 44b formed of a resin, and the magneto-resistive element (MR element) 44c mounted on the surface of the upper control board 42 opposed to the magnet 44a and serving to detect the direction of the magnetic field of the magnet 44a. Therefore, the magnet 44a and the Hall element 44c which constitute the position sensor 44 can be prevented from being abraded so that an abrasion resistance can be enhanced.

While the nozzle vane driving control apparatus to be directly attached to the variable nozzle turbocharger in the commercial diesel engine has been described in the embodiment, it is a matter of course that the embodiment can be applied to the variable nozzle turbocharger of another internal combustion engine such as a gasoline engine.

As described above, according to the first aspect of the invention, the actuator for carrying out a driving operation for opening and closing the nozzle vane of the variable nozzle and the electronic control unit for controlling the opening degree of the nozzle vane which is obtained by the actuator are removably attached by the fastening member and are thus integrated with each other. Consequently, it is possible to save an attachment space and to reduce a size and a weight, and furthermore, to enhance a durability and a responsiveness.

According to the second aspect of the invention, the brushless motor is used as a motor. Consequently, it is possible to prolong the lifetime of the actuator, and furthermore, to enhance the durability still more.

According to the third aspect of the invention, a pair of control boards are provided opposite to each other in the two stages in the vertical direction with the partition wall on the center in the axial direction of the unit body interposed therebetween. Consequently, the heat generating component mounted on the lower control board can effectively generate heat by the partition wall, and furthermore, the transfer of the heat from the heat generating component to the electronic chip component mounted on the upper control board can be hindered.

According to the fourth or fifth aspect of the invention, the position sensor for detecting the position of the output shaft is a non-contact type sensor. Consequently, it is possible to enhance the abrasion resistance of a component constituting the position sensor.

What is claimed is:

1. A nozzle vane driving control apparatus of a variable nozzle turbocharger comprising:
(A) an actuator for carrying out a driving operation for opening and closing a nozzle vane of a variable nozzle, the actuator including
a base having a motor case portion,
a motor having a motor shaft to be accommodated in the motor case portion,
a pinion coupled to the motor shaft of the motor,
an output shaft having a sector gear supported rotatably on the base and mated with the pinion through reduction gears, an output arm fixed to an upper portion of the output shaft and connected to the nozzle vane, and an actuator cover for covering the pinion and the reduction gears; and (B) an electronic control unit for controlling an opening degree of the nozzle vane which is obtained by the actuator, the electronic control unit including a unit body attached removably to a lower end of the base, a control board accommodated in the unit body, a position sensor attached to a lower portion of the output shaft opposite to the control board and serving to detect a rotating position of the output shaft, a connector having a terminal accommodated in the unit body and connecting the motor and the control board, and a unit cover for covering the unit body;

wherein the actuator cover, the base, the unit body and the unit cover are removably attached by fastening members and are thus integrated with each other.

2. The nozzle vane driving control apparatus of the variable nozzle turbocharger according to claim 1, wherein a brushless motor is used as the motor.

3. The nozzle vane driving control apparatus of the variable nozzle turbocharger according to claim 1, wherein a pair of the control boards are provided opposite to each other interposing a partition wall of the unit body therebetween in a vertical direction, and electronic chip components which generate heat are mounted on the lower control board.

4. The nozzle vane driving control apparatus of the variable nozzle turbocharger according to claim 1, wherein the position sensor for detecting a position of the output shaft is a non-contact type sensor.

5. The nozzle vane driving control apparatus of the variable nozzle turbocharger according to claim 4, wherein the position sensor is constituted by a magnet attached to the lower portion of the output shaft through a holder, and a magneto-resistive element mounted on a surface of the upper control board which is opposed to the magnet and serving to detect a direction of a magnetic field of the magnet.

* * * * *